United States Patent

[11] 3,589,818

[72] Inventor Harold Mountain
19324 Fenmore, Detroit, Mich. 48235
[21] Appl. No. 883,036
[22] Filed Dec. 8, 1969
[45] Patented June 29, 1971

[54] WRIST-ATTACHABLE PHOTOGRAPHIC LIGHT METER
5 Claims, 3 Drawing Figs.

[52] U.S. Cl. ................................................ 356/220,
356/226, 356/256
[51] Int. Cl. ....................................................... G01j 1/42,
G01j 1/44, G02b 27/32
[50] Field of Search ............................................ 250/83.3 R,
83 PH, 212; 356/213, 226, 220, 256

[56] References Cited
UNITED STATES PATENTS
2,946,890 7/1960 Samples ...................... 250/83

3,509,712 5/1970 Grohoski..................... 58/23

Primary Examiner—Ronald L. Wibert
Assistant Examiner—Warren A. Sklar
Attorney—Whittemore, Hulbert & Belknap ABSTRACT: The wrist-attachable photographic light meter comprises a wristwatchlike unit including the usual light meter indicator and light sensitive photocell. The light meter indicator is provided in a separate casing positionable on one of the upper and lower wrist surfaces and the light sensitive photocell is provided in a separate casing positionable on the other wrist surface. A flexible strap interconnects these units to hold the device in place on a user's wrist. Electrical wires are mounted on one strap section to electrically interconnect the indicator with the light sensitive photocell.

PATENTED JUN29 1971  3,589,818

INVENTOR.
HAROLD MOUNTAIN
BY Littemore Hulbert
& Belknap
ATTORNEYS

WRIST-ATTACHABLE PHOTOGRAPHIC LIGHT METER

BACKGROUND OF THE INVENTION

Light meters have been in widespread use as an aid in photography for a long period of time. Light meters indicate to the photographer the intensity of the light so that he may adjust his various camera settings to an optimum point. Prior art light meters have been provided in a single casing which has included both the indicator means and light sensitive photocell means. As is well known, photographers must carry a variety of different camera components and photographic aids which have encumbered and inhibited his ability to quickly and efficiently take photographs.

In accordance with the present invention, a light meter having conventional metering structure is provided However, the metering structure comprising the light sensitive photocell is provided in one casing and the indicator means which is responsive to the electrical signal generated by the photocell is provided in a second casing structure. The casing structures are interconnected by a flexible strap so that the device may be mounted on the user's wrist. The user thus does not have to hold a light meter in his hand but may merely refer to the indicator on his wrist to determine the intensity of light and is thus able to make the proper camera settings. This not only eliminates the problem of handling the light meter each time it is used but also frees the photographer's hands so that he may simultaneously take meter readings and make camera settings.

SUMMARY OF THE INVENTION

A wrist-attachable photographic light meter is provided. The meter includes a first casing enclosing a photocell for generating an electrical signal in response to light rays impinged thereon and in proportion to the intensity of the light. The first casing has opening means to admit light rays into the interior thereof for impingement on the photocell. A second casing is provided. The second casing encloses electrical means for converting the electrical signals from the photocell into a mechanical force proportional to the magnitude of the signal. Indicator means are connected to and driven by the electrical means a degree proportional to said mechanical force. Externally visible indicia are provided on the second casing correlated to the indicator means to render a light meter reading when the indicator means is driven. The first and second casings are interconnected by first and second strap means. Each strap means extends between opposite sides of the casings to define a complete ring of a size to snugly fit the wrist of a user. Electrical conductor means extend along one of the strap means. The electrical conductor means are connected at one end to the photocell in the first casing and at the other end to the electrical means in the second casing.

IN THE DRAWING

Figure 3:
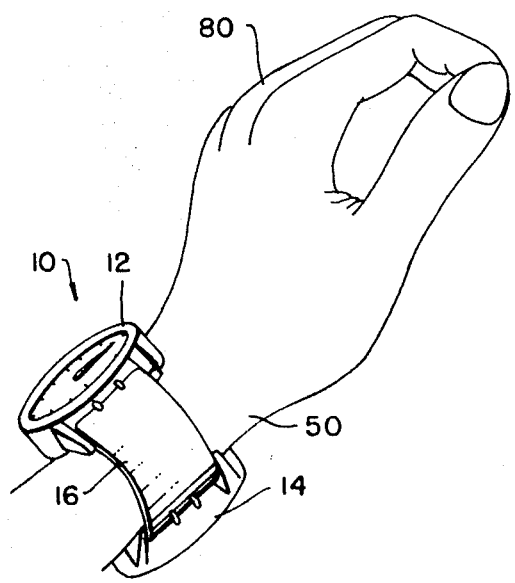
FIG. 3 is a view in perspective illustrating attachment of the light meter to a user's wrist.

The wrist-attachable photographic light meter 10 includes two casings 12, 14 which are fixedly secured together on one side by a flexible strap section 16 which may be fabricated of leather, plastic or the like. As will be noted, each casing has a pair of spaced-apart outwardly extending ears 18, 20, 22, 24 through which a pin 26, 28 extends in engagement with loops 30, 32 of the strap 16 to thereby permit pivoting of the casing with respect to the strap. Strap sections 34, 36 are attached to the other side of each casing between spaced-apart ears 38, 40, 42, 44. One of the strap sections 34 has a buckle 46 while the other strap section 36 has a plurality of spaced apart holes 48 for adjustable attachment to the buckle for a detachable securement of the user's wrist 50 as illustrated in FIG. 3.

One of the casings 14 encloses a conventional photocell device 52. An opening 54 covered by a transparent glass or plastic pane 56 is provided in the wall 58 of the casing for transmission of light rays into the casing for impingement upon the photocell. The photocell 52 may be, for example, a photovoltaic photodiode or other conventional device of the type in which the material thereof generates a small electrical current when light rays are impinged thereon. The size of the current is proportional to the intensity of the light. Therefore, measurement of the current may be converted to a light intensity reading for photographic purposes. Contrariwise, a device which emits a voltage signal may also be used.

The other casing 12 encloses indicator structure for converting the electrical pulse generated by the photocell 52 into visually observable indicia indicating the intensity of the light. An opening 60 is provided in the outer face or wall 62 of the casing 12. The opening 60 is covered by a transparent glass or plastic pane 64. The indicia 66 indicates light intensity. A pointer 68 is pivotably mounted at one end on a pin 70 centrally of the indicia 66. The pin 70 extends into the casing 12. Conventional mechanism 69 is provided within the casing 12 for actuating the pin 70 and thus the pointer 68. The mechanism 69 includes a spring bias for the pin 70 in one direction. A coil is placed across the power source, namely the photocell 52. The field strength developed by the coil is directly related to the magnitude of the generated current. The coil causes the pin 70 to rotate in a direction opposed to the spring load through an arc determined by the field strength. This arc is translated by the pointer 68 and indicia 66 into light meter readings.

Figure 1:
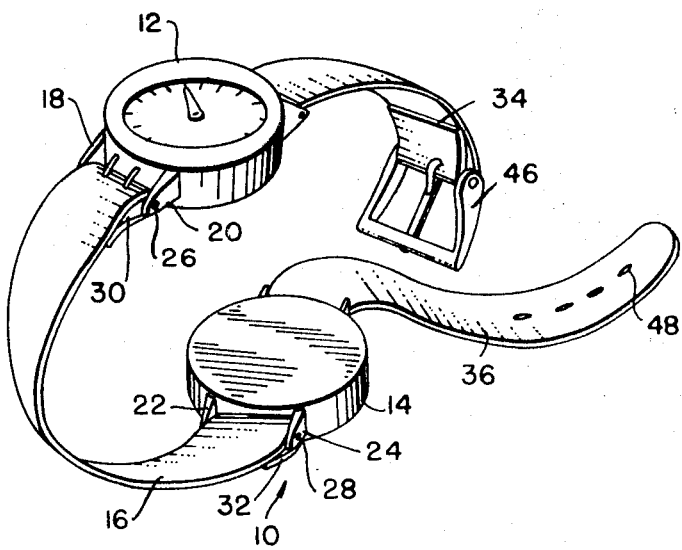
FIG. 1 is a view in perspective of one embodiment of the wirst-attachable photographic light meter of the present invention.
Figure 2:
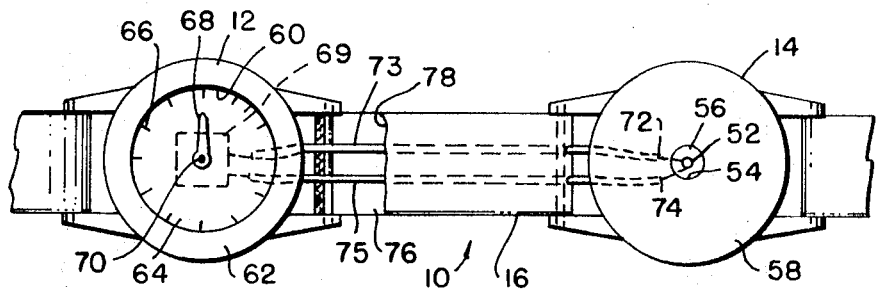
FIG. 2 is a plan view of the central portion of the light meter of FIG. 1.

As will be noted in FIG. 2, a pair of electrical leads 72, 74 extend from the casing 12 to the casing 14. The leads 72, 74 extend through openings in the sidewall of the casing 12 and into connection interiorly thereof with the coil of mechanism 69 provided therein. At the other end, the leads 72, 74 extend through openings in the sidewall of the casing 14 and are connected interiorly thereof across the output of the photocell 52. The leads 72, 74 are encased in a flexible covering 73, 75 to form flexible cables which may be wrapped around the user's wrist without damage thereto. The cables are illustratively imbedded in the strap section 16 between the layers 76, 78. These cables, however, may be adhered to the exterior surface of the strap. Imbedding the cables interiorly of the strap, however, is preferred because the strap then serves as a protective covering for the cables.

The strap sections 16 and 34, 36 are of about equal length when connected on a wrist and result in the casings 12, 14 being spaced apart about 180°. When the light meter 10 is attached to the user's wrist 50 as illustrated in FIG. 3, the casing 12 is preferably on the top side while the casing 14 is preferably on the bottom side, for the convenience of the user. However, this positionment may be reversed at the discretion of the user. As will be appreciated, provision of the meter as a wrist-attachable device frees the user's hand 80 for grasping photographic paraphernalia during the picturetaking process and also avoids the necessity for fishing a meter out of a carrying case or dangling the meter from the photographers belt as has been the practice in the past.

What I claim as my invention is:

1. A wrist-attachable photographic light meter comprising a first casing enclosing a photocell for generating an electrical signal in response to light rays impinged, thereon and in proportion to the intensity of the light, said first casing having opening means to admit light rays into the interior thereof for impingement on the photocell, a second casing enclosing electrical means for converting the electrical signals from the photocell into a mechanical force proportional to the magnitude of the signal, indicator means connected to and driven by said electrical means a degree proportional to said mechanical force, externally visible indicia on said second casing correlated to the indicator means to render a light meter reading when the indicator means is driven, said first and second casings being interconnected by first and second strap means each extending between opposite sides of the casings to define a complete ring of a size to snugly fit the wrist of a user, and electrical conductor means connected at one end to the photocell in the first casing and at the other end to said electrical means in the second casing.

2. A wrist-attachable photographic light meter as defined in claim 1, and further characterized in that said first and second strap means are of about equal length whereby the first and second casings are spaced about 180° apart with the result that one of said casings is positionable on the upper wrist surface while the other of said casings is positionable on the lower wrist surface.

3. A wrist-attachable photographic light meter as defined in claim 1, and further characterized in that said electrical conductor means are imbedded in said one strap means.

4. A wrist-attachable photographic light meter as defined in claim 1, and further characterized in that said electrical conductor means include an electrically conductive wire structure encased in a flexible covering to thereby form flexible cables.

5. The wrist-attachable photographic light meter as defined in claim 1, and further characterized in that the strap means along which the electrical conductor means does not extend comprises a pair of strap sections including means for detachable, adjustable connection together for mounting on a user's wrist.